UNITED STATES PATENT OFFICE.

ALEXANDRE LAMARRE, OF PARIS, FRANCE, ASSIGNOR TO GRATIOT WASHBURNE.

IMPROVEMENT IN PYROTECHNIC SIGNALS.

Specification forming part of Letters Patent No. 144,030, dated October 28, 1873; application filed July 26, 1873.

*To all whom it may concern:*

Be it known that I, ALEXANDRE LAMARRE, of Paris, France, have invented a new composition of matter for producing, by its combustion, brilliant lights for signals, &c.; and I do hereby declare that the following is a full and clear description of the manner of producing said composition, for which I have received a French patent, or brevet d'invention, dated December 30, 1871.

The novel feature of my said invention is the combination, with the other ingredients usually employed in the production of pyrotechnic lights, of a pasty hydrocarbon, which I denominate linseed-glue. This glue may be produced by reducing the linseed-oil of commerce, or other oil possessing substantially the same properties, to about one-half of its original volume by the action thereupon of heat. This may be done by gradual evaporation of the oil, or by raising its temperature to such a degree that it can be ignited by the application of fire to its surface, and, when thus ignited, allowing the same to burn until it has been reduced to about the consistence of honey, and then extinguishing the flame by the exclusion of air therefrom.

The combination of the aforesaid hydrocarbon with the chlorates and other chemicals usually employed in the production of compositions for producing pyrotechnic lights increases the brilliancy of said lights, reduces the cost of production, prevents all danger of spontaneous combustion, and all danger of injury from the effects of moisture. Said combination of linseed-glue with the other chemicals usually employed in the production of compositions for producing pyrotechnic lights also renders it impossible to ignite my new composition of matter by any percussion that may be caused by careless handling or otherwise.

The proportion of the aforementioned linseed-glue with the chlorates and other chemicals, in the production of my new composition of matter, may be varied in relation to the entire mass, depending upon the color and the desired duration of the light to be produced.

The following are the formulas usually employed by me in the production of my new composition of matter to be employed in the production of signal-lights, &c.:

RED LIGHT.

| | Grammes. |
|---|---|
| Chlorate of potash | 500 |
| Nitrate of strontian, dried | 500 |
| Charcoal, pulverized | 30 |
| Linseed-glue | 150 |

WHITE LIGHT.

| | |
|---|---|
| Chlorate of potash | 1000 |
| Nitrate of baryta | 400 |
| Carbonate of chalk | 100 |
| Linseed-glue | 200 |

BLUE LIGHT.

| | |
|---|---|
| Chlorate of potash | 1000 |
| Oxychloride of copper | 200 |
| Linseed-glue | 150 |

GREEN LIGHT.

| | |
|---|---|
| Chloride of baryta | 500 |
| Nitrate of baryta | 250 |
| Linseed-glue | 120 |

YELLOW LIGHT.

| | |
|---|---|
| Chlorate of potash | 1000 |
| Oxalate of soda | 200 |
| Charcoal | 30 |
| Linseed-glue | 150 |

ROSE LIGHT.

| | |
|---|---|
| Chlorate of potash | 1000 |
| Carbonate of chalk | 250 |
| Linseed-glue | 150 |

To obtain the composition, it suffices to put the ingredients in a mortar, working them with the stamper, so as to obtain a homogeneous and soft paste.

My new composition of matter may be employed in the production of every description of signal-light, and every description of pyrotechnic fire-works.

I claim as my invention—

The combination of the within-described linseed-glue with the chlorates and other chemicals usually employed in the production of compositions of matter for producing signal-lights and other pyrotechnic lights, substantially as and for the purpose herein set forth.

A. LAMARRE.

Witnesses:
AUGUSTUS BIESEL,
F. FRANCIS.